US010491687B2

(12) United States Patent
Karlsson et al.

(10) Patent No.: US 10,491,687 B2
(45) Date of Patent: Nov. 26, 2019

(54) METHOD AND SYSTEM FOR FLEXIBLE NODE COMPOSITION ON LOCAL OR DISTRIBUTED COMPUTER SYSTEMS

(71) Applicant: PACKSIZE LLC, Salt Lake City, UT (US)

(72) Inventors: Stefan Karlsson, Salt Lake City, UT (US); Andreas Harnesk, Salt Lake City, UT (US)

(73) Assignee: Packsize LLC, Salt Lake City, UT (US)

( * ) Notice: Subject to any disclaimer, the term of this patent is extended or adjusted under 35 U.S.C. 154(b) by 572 days.

(21) Appl. No.: 14/892,480

(22) PCT Filed: May 14, 2014

(86) PCT No.: PCT/US2014/038009
§ 371 (c)(1),
(2) Date: Nov. 19, 2015

(87) PCT Pub. No.: WO2014/189737
PCT Pub. Date: Nov. 27, 2014

(65) Prior Publication Data
US 2016/0119436 A1    Apr. 28, 2016

Related U.S. Application Data

(60) Provisional application No. 61/825,284, filed on May 20, 2013.

(51) Int. Cl.
*H04L 29/08* (2006.01)
*G06F 9/54* (2006.01)
*H04L 29/06* (2006.01)

(52) U.S. Cl.
CPC .............. *H04L 67/16* (2013.01); *G06F 9/542* (2013.01); *H04L 63/123* (2013.01); *H04L 67/10* (2013.01); *G06F 2209/548* (2013.01)

(58) Field of Classification Search
CPC ....... H04L 67/16; H04L 67/10; H04L 63/123; G06F 9/542; G06F 2209/548
See application file for complete search history.

(56) References Cited

U.S. PATENT DOCUMENTS

| | | | |
|---|---|---|---|
| 2005/0267947 A1 | 12/2005 | Patrick et al. | |
| 2007/0025351 A1* | 2/2007 | Cohen | G06F 9/542 370/390 |

(Continued)

FOREIGN PATENT DOCUMENTS

| | | |
|---|---|---|
| CN | 101821993 | 9/2010 |
| CN | 102377685 | 3/2012 |

(Continued)

OTHER PUBLICATIONS

International Search Report and Written Opinion, U.S. International Search Authority, PCT/US2014/038009, dated Dec. 19, 2014 completion of international search.

(Continued)

*Primary Examiner* — Austin J Moreau
(74) *Attorney, Agent, or Firm* — Workman Nydegger (57) ABSTRACT

Embodiments are directed to scaling services, transitioning from a first service version to a second version and to implementing an external system integration service. In one scenario, a computer system establishes a message broker service that maintains message queues that allow communication between services. The message queues receive messages from publishers and transfer messages to subscribers. The computer system indicates a specified message queue for each service, where the specified message queue is configured to maintain messages for that service. The computer system also moves at least one of the services to a second, different computer system, while the specified message queue maintains messages for the moved service. The computer system further allows an external system (Continued)

integration service to be implemented which subscribes to specified, registered messages and forwards the registered messages to selected external entities.

24 Claims, 7 Drawing Sheets

(56) References Cited

U.S. PATENT DOCUMENTS

| | | | |
|---|---|---|---|
| 2007/0061815 A1* | 3/2007 | Graham | G06F 9/542 |
| | | | 719/313 |
| 2007/0143430 A1* | 6/2007 | Johnson | G06F 9/544 |
| | | | 709/206 |
| 2007/0294578 A1 | 12/2007 | Qiao et al. | |
| 2008/0104258 A1* | 5/2008 | O'Neill | H04L 67/325 |
| | | | 709/228 |
| 2008/0114895 A1 | 5/2008 | Chun | |
| 2009/0228563 A1 | 9/2009 | Jones et al. | |
| 2010/0070553 A1 | 3/2010 | Addala et al. | |
| 2010/0241717 A1 | 9/2010 | Hawkins et al. | |
| 2011/0087632 A1 | 4/2011 | Subramanian et al. | |
| 2012/0233268 A1 | 9/2012 | Bedi et al. | |
| 2012/0246337 A1* | 9/2012 | Ross | H04L 45/308 |
| | | | 709/238 |
| 2013/0007505 A1* | 1/2013 | Spear | G06F 11/2025 |
| | | | 714/4.11 |
| 2013/0060834 A1* | 3/2013 | Paramasivam | H04L 12/66 |
| | | | 709/202 |
| 2014/0181928 A1* | 6/2014 | Bergman | H04L 63/04 |
| | | | 726/6 |
| 2015/0058290 A1* | 2/2015 | Hu | H04L 67/1002 |
| | | | 707/617 |

FOREIGN PATENT DOCUMENTS

| | | |
|---|---|---|
| EP | 1043671 | 10/2000 |
| JP | H10500509 | 1/1998 |
| JP | 2000259581 | 9/2000 |
| JP | 2005004676 | 1/2005 |
| JP | 2006523905 | 10/2006 |
| JP | 2009223403 | 10/2009 |
| JP | 2011141695 | 7/2011 |

OTHER PUBLICATIONS

European Search Report issued in European Application No. 14801579.5, dated Dec. 15, 2016.

Tanenbaum et al., "Distributed systems: principles and paradigms", translated by Tadanori Mizuno (second edition, pearson education Japan, K.K., Jan. 25, 2009, pp. 150-154).

* cited by examiner

METHOD AND SYSTEM FOR FLEXIBLE NODE COMPOSITION ON LOCAL OR DISTRIBUTED COMPUTER SYSTEMS

CROSS-REFERENCE TO RELATED APPLICATION

This application claims priority to and the benefit of PCT Application No. PCT/US2014/038009, filed May 14, 2014, entitled "METHOD AND SYSTEM FOR FLEXIBLE NODE COMPOSITION ON LOCAL OR DISTRIBUTED COMPUTER SYSTEMS", which claims the benefit of and priority to U.S. Provisional Application No. 61/825,284, filed May 20, 2013, entitled "METHOD AND SYSTEM FOR FLEXIBLE NODE COMPOSITION ON LOCAL OR DISTRIBUTED COMPUTER SYSTEMS". All the aforementioned applications are incorporated by reference herein in their entirety.

BRIEF SUMMARY

Embodiments described herein are directed to scaling services, transitioning from a first service version to a second version and to implementing an external system integration service. In one embodiment, a computer system establishes a message broker service that maintains message queues that allow communication between services. The message queues receive messages from publishers and transfer messages to subscribers. The computer system indicates a specified message queue for each service, where the specified message queue is configured to maintain messages for that service. The computer system also allows at least one of the services to be moved to a second, different computer system, while the specified message queue maintains messages for the moved service.

In another embodiment, a computer system transitions from a first service version to a second version. The computer system instantiates the first version of the service and instantiates a second version of the same service, so that the first version of the service and the second version of the service are running simultaneously. The computer system then determines that a message sent to the first version of the service for processing (or a message that has not yet been sent to any service) is to be sent to the second version of the service and processes the message using the second version of the service.

In yet another embodiment, a computer system implements an external system integration service. The computer system determines that an internal message broker service has been established. The message broker service is configured to maintain message queues that allow communication between services. The message queues receive messages from publishers and transfer messages to subscribers. The computer system instantiates an external system integration service in conjunction with the internal message broker service. The external system integration service is configured to subscribe to specified, registered messages and forward the registered messages to various external entities. Configuration of external system integration service may be performed by the computer system or by the external system that is using the external system integration service. The computer system also receives a message for which the external system integration service has registered and the external system integration service forwards the received registered message to the specified external entities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to scaling services, transitioning from a first service version to a second version and to implementing an external system integration service. In one embodiment, a computer system establishes a message broker service that maintains message queues that allow communication between services. The message queues receive messages from publishers and transfer messages to subscribers. The computer system indicates a specified message queue for each service, where the specified message queue is configured to maintain messages for that service. The computer system also allows at least one of the services to be moved to a second, different computer system, while the specified message queue maintains messages for the moved service.

In another embodiment, a computer system transitions from a first service version to a second version. The computer system instantiates the first version of the service and instantiates a second version of the same service, so that the first version of the service and the second version of the service are running simultaneously. The computer system then determines that a message sent to the first version of the service for processing (or a message that has not yet been sent to any service) is to be sent to the second version of the service and processes the message using the second version of the service.

In yet another embodiment, a computer system implements an external system integration service. The computer system determines that an internal message broker service has been established. The message broker service is configured to maintain message queues that allow communication between services. The message queues receive messages from publishers and transfer messages to subscribers. The computer system instantiates an external system integration service in conjunction with the internal message broker service. The external system integration service is configured to subscribe to specified, registered messages and forward the registered messages to various external entities. Configuration of external system integration service may be performed by the computer system or by the external system that is using the external system integration service. The computer system also receives a message for which the external system integration service has registered and the external system integration service forwards the received registered message to the specified external entities.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
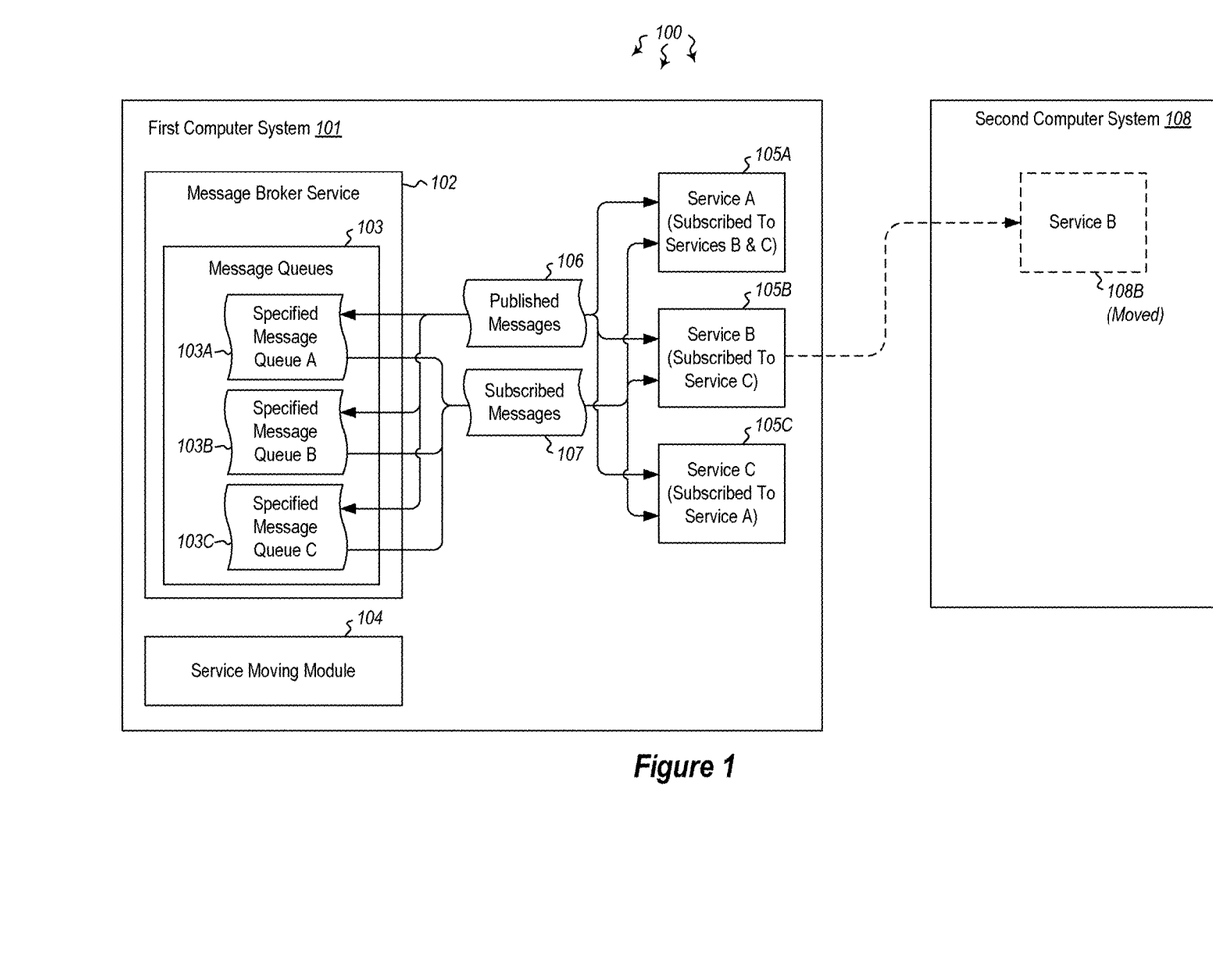
FIG. 1 illustrates a computer architecture in which embodiments described herein may operate including scaling services.

FIG. 1 illustrates a computer architecture 100 in which at least one embodiment may be employed. Computer architecture 100 includes first computer system 101 and second computer system 108. The first and second computer systems 101 and 108 may be any type of local or distributed computer systems, including cloud computing systems. The computer systems may include modules for performing a variety of different functions. For instance, first computer system 101 includes a message broker service 102. The message broker service may be instantiated on the first computer system and may be used to interact with services including, but not limited to, services A, B and C (105A, 105B and 105C, respectively). Services A-C may be any type of computer services, applications, functions or other types of software functionality.

The message broker service 102 may be configured to maintain message queues 103. The message queues may receive messages published from the services (105A-105C) and may send those messages to subscribers of those messages. Thus, as indicated in FIG. 1, service A is subscribed to messages from services B and C. Accordingly, whenever service B or C publishes a message (e.g. published message 106), the corresponding message queues B and C (103B and 103C, respectively) forward any subscribed messages 107 to service A. Similarly, because service B is subscribed to service C's messages, message queue C (103C) forwards the subscribed messages 107 published by service C to service B. Furthermore, because service C is subscribed to service A's messages, message queue A (103A) forwards the subscribed messages 107 published by service A to service C. In some cases, it should be noted, the message broker service 102 may maintain a single queue or multiple queues. For instance, services may subscribe to messages based on topic. As such, to the service it may appear that the queue only services messages of that topic, when in reality a single message queue may have messages of many different topics.

While three services are shown in FIG. 1, and while each of the services are shown as being both publishers and subscribers, it will be understood that substantially any number of services may be instantiated, and that any of the services may be publishers only, subscribers only, or both publishers and subscribers. In this manner, services can subscribe to receive messages from certain services, and those services do not need to worry about who is subscribed, or whom to send the messages to. Rather, the services can publish their messages to the message broker, and the message broker's message queues will properly forward the messages to those services subscribed to receive them.

It should also be noted that services may be moved from one computing system to another. For example, service B (105B) may be moved from the first computer system 101 to the second computer system 108. The service may be moved after the service has stopped running, or may be moved dynamically, while the service is running. As such, services may be moved or transferred between computing systems during runtime by service moving module 104 of computer system 101. These concepts will be explained further below with regard to methods 200, 300 and 400 of FIGS. 2, 3 and 4, respectively.

Figure 2:
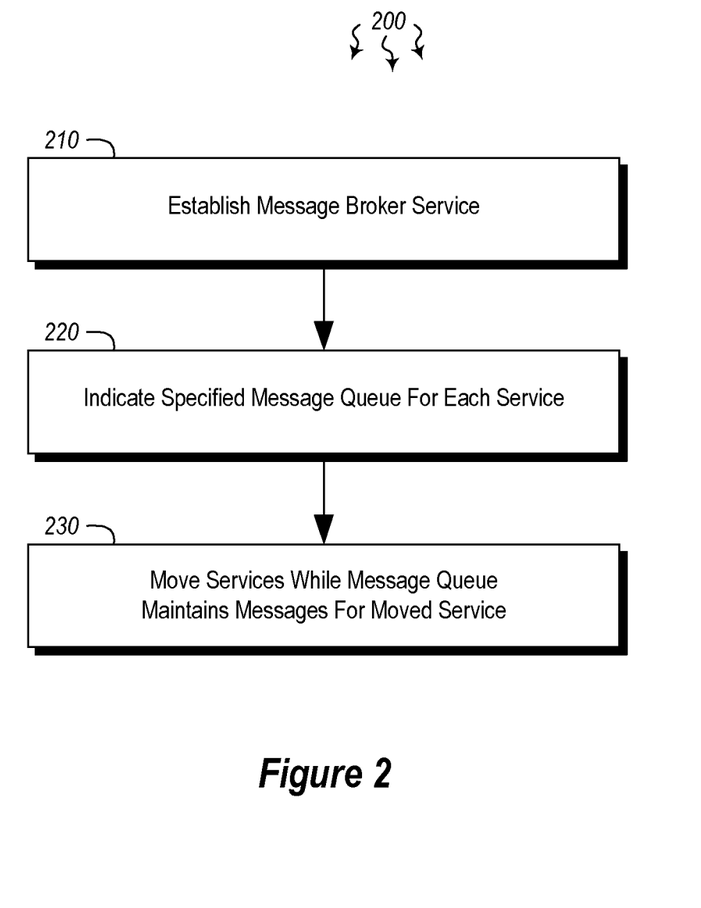
FIG. 2 illustrates a flowchart of an example method for scaling services.
Figure 3:
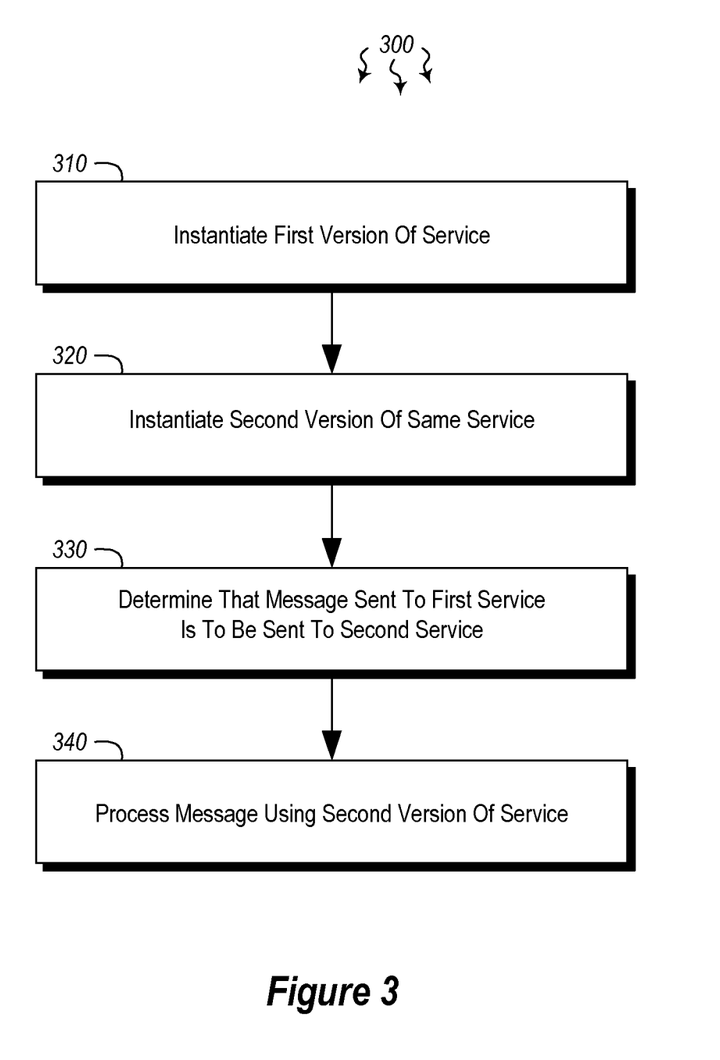
FIG. 3 illustrates a flowchart of an example method for transitioning from a first service version to a second version.
Figure 4:
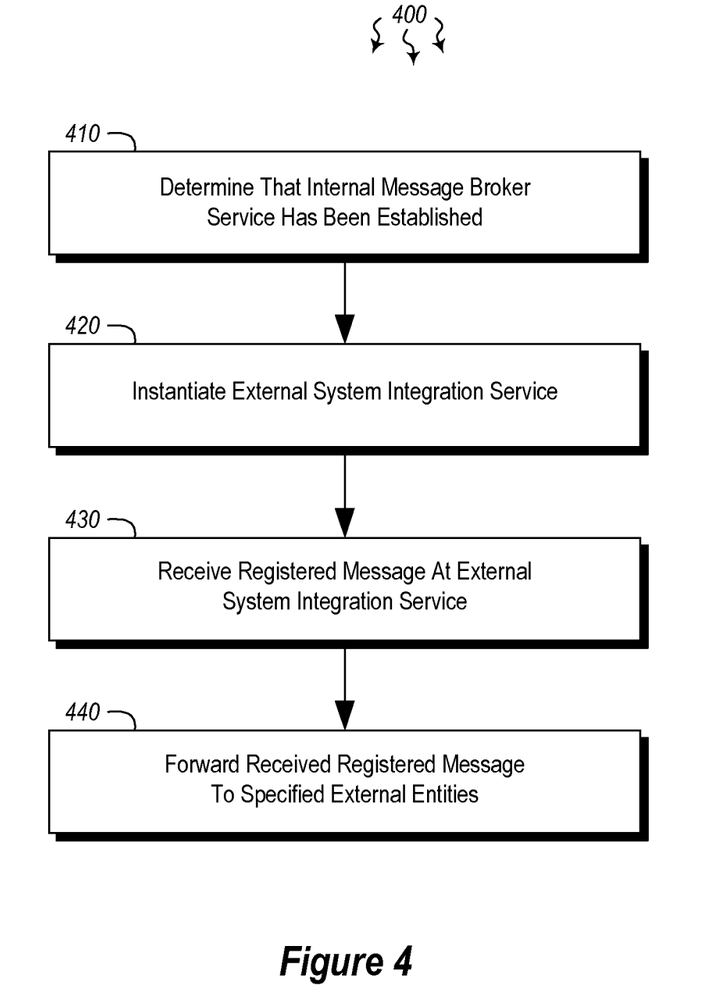
FIG. 4 illustrates a flowchart of an example method for implementing an external system integration service.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for scaling services. The method 200 will now be described with frequent reference to the components and data of environment 100.

Method 200 includes establishing a message broker service that maintains one or more message queues that allow communication between services, the message queues being configured to receive messages from publishers and transfer messages to subscribers (210). For example, the first computer system 101 may establish message broker service 102. The message broker service 102 facilitates communication between services such as services 105A-105C (or others not shown). The message broker service 102 initiates and manages various message queues 103 that receive messages from publishers (i.e. published messages 106) and transfers messages to subscribers (i.e. subscribed messages 107). Thus, a publisher (e.g. service 105A) can publish messages related to its operational status, its operational results, notification messages or other types of messages. These messages may be published without regard for who is actually subscribing to those messages.

In some cases, the services in communication with the message broker service 102 may be publishers only (i.e. they are not subscribed to any other service's messages). In other cases, the services may be subscribers only (i.e. they do not publish messages for other subscribers). In still other cases, the services 105A-105C may be both publishers and subscriber (i.e. they both publish messages and receive messages to which they are subscribed (e.g. subscribed messages 107). The services 105A-C may be running on a single computer system or on multiple computer systems. Moreover, the services may be moved between computer systems before, after or during operation. In some cases, a service may have at least two different instances of itself running on the same or multiple different computer systems. For example, the message broker service 102 may have two or more different instances of itself on multiple different computer systems, for failover or other purposes.

Method 200 further includes indicating a specified message queue for each of the one or more services, the specified message queue being configured to maintain messages for that service (220). The message broker service 102 may initiate many different message queues 103. Some or all of these message queues may be specifically assigned to handle messages for certain services. Thus, message queue A (103A) may be specifically assigned to process the messages of service A (105A). Thus, message queue A will receive service A's published messages 106 and send them to those services (or other entities) that are subscribed to receive service A's messages (e.g. service C (105C)). Similarly, message queue B (103B) may be assigned to handle service B's messages and message queue C (103C) may be assigned to handle service C's messages.

Method 200 then includes moving at least one of the services to a second, different computer system, wherein the specified message queue maintains messages for the moved service (230). The service moving module 104 of first computer system 101 may move any one or more of services 105A-C to another computer system. Thus, for example, service moving module 104 may move service B (105B) from computer system 101 to second computer system 108. The services may be moved at any time during the service's operation. Additional services may be dynamically added before, after or during runtime. Similarly, existing services may be dynamically removed before, after or during runtime. Services may be moved, added or removed to increase throughput or decrease the cost of using additional computer systems, to assist in load balancing, to assist in failover, or for other reasons. Although embodiments described herein describe implementations involving two or three services, this is merely done for simplicity's sake, and it should be noted that substantially any number of services may be moved, added or removed to assist in throughput, load balancing, failover or for other reasons.

Figure 7:
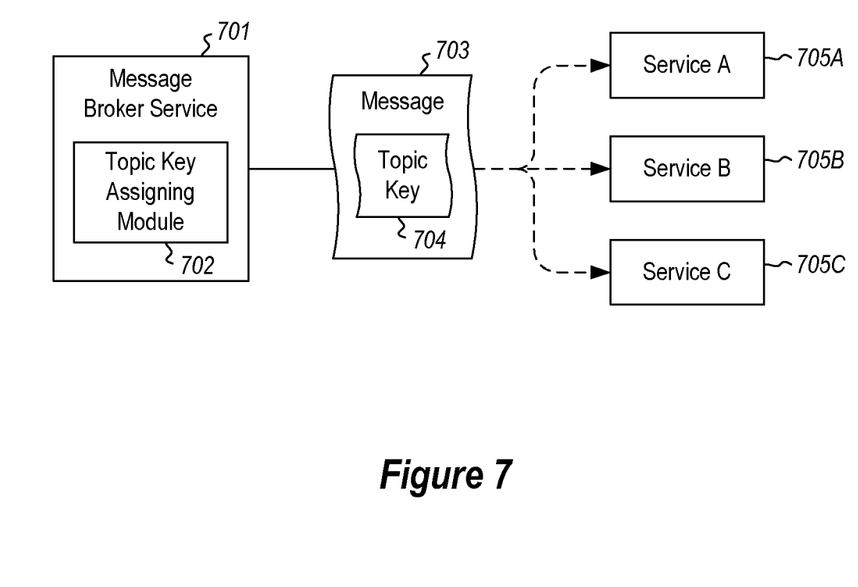
FIG. 7 illustrates an embodiment in which messages are routed by the message broker service using an assigned topic key.

In some embodiments, as shown in FIG. 7, the topic key assigning module 702 of the message broker service 701 may assign each message 703 a topic key 704. The topic key 704 indicates the topic for that message 703. The topic may indicate, for example, that the message 703 is a notification message, or is a reporting message. These messages, with their corresponding topic keys, may be routed to subscribers based on the message's assigned topic key. As such, messages associated with specified topic keys 704 are routed by the message broker service 701 to subscribers that have subscribed to messages of that topic. For instance, if service A (705A) has subscribed to messages of a certain topic (e.g. "error" or "complete" or "operational status"), messages having topic keys corresponding to those message subjects will be routed to service A. The message broker service 701 will similarly route messages to services B (705B) and C (705C), based on which message topics they have subscribed to. Thus, in these embodiments, subscribers may subscribe to all messages from a certain publisher, or only to messages from that publisher that have a specified topic key. Moreover, subscribers may simply subscribe to messages that have a certain topic key, regardless of who the publisher is. In this manner, publishers may publish messages as events occur, and these messages may be routed to subscribers by the message broker service 701.

At least in some cases, the publishers may be entirely unaware of who is subscribing to their messages. The message broker may allow any of the services to publish messages to the message queue, and may further allow any subscriber to receive messages from the message queue. The subscribed messages 107 may indicate to the subscriber who published the message, and may further indicate the assigned topic key for that message. In some cases, the messages may include a security token that verifies the origin (i.e. the publisher) of the message. The message subscriber may access the security token and determine whether it is valid. If it is valid, the message will be published on the message queue. If the security token is invalid, the message may be labeled as invalid and discarded or ignored. Furthermore, the publisher of the invalid security token and/or the subscriber may be notified that their security token is invalid. In some embodiments, a security policy may be initiated that allows some messages to be accessed and routed without a security token, while other (perhaps higher priority) messages will require a valid token before the message can be accessed. Furthermore, in some embodiments, the first computer system 101 may need to transition from one service to another. Such embodiments will be described below in connection with FIG. 3.

In some embodiments, a service monitoring service may be implemented. The service monitoring service may monitor the operational state of the services in the system. The service monitoring service may be configured to monitor a single, specified service, or a plurality of different services, including the message broker service. Monitoring may include sending status checks to one or more of the services. These status checks may be internal messages sent between the services and the service monitoring service. These status checks may be used to determine whether services are functioning properly. The service monitoring service thus determines whether the services have responded to the status checks, and, for each service that has not responded to the status checks, may notify various users (including, e.g. system administrators) that the service is not operating correctly.

The service monitoring service may further be configured to determine which services are listening to specified message types, publishing specified message types, subscribing to specified message types, processing specified numbers of messages or determining the number of messages processed by the system as a whole. In some cases, if a service is processing more or fewer than a known amount, that service may likely be functioning erroneously. Similarly, publishers or subscribers for certain message types may receive or publish relatively large amounts of messages, and may thus be more prone to error. The data from the service monitoring service can be used to increase the number of services to increase message processing throughput, or it could decrease the number of services to decrease processing costs. These increases or decreases in services may be implemented automatically and dynamically as processing needs change. Moreover, the service monitoring service can be configured to provide recommendations for manually adding or removing services.

Still further, the service monitoring service may identify which services, including dependent services, are currently available for message processing. Then, based on this information, the service monitoring service may control various message processing settings based on the determined current availability of the services. For example, services within the system or external systems using the external system integration service can be configured to process messages differently depending on the availability information presented by the service monitoring service. For instance, a publisher may be able to determine from the availability information how to route messages to those services that are currently available.

FIG. 3 illustrates a flowchart of a method 300 for transitioning from a first service version to a second version. The method 300 will now be described with frequent reference to the components and data of environments 100 of FIG. 1 and 500 of FIG. 5.

Method 300 includes instantiating a first version of a service (310). For example, service instantiating module 502 of computer system 501 may instantiate a first version of a service 503A, and may further instantiate a second version of the same service 503B, so that the first version of the service and the second version of the service are running simultaneously (320). As above, this service may be instantiated in multiple different versions, including three or more versions (not shown in FIG. 5). These services may be any type of computing functionality including services, applications, software functions or other software elements. The first version 503A, in some cases may be a newer, upgraded version of the service, while the second version 503B, may be an older, non-upgraded version. These newer and older versions may be run simultaneously, or may be run individually.

Figure 5:
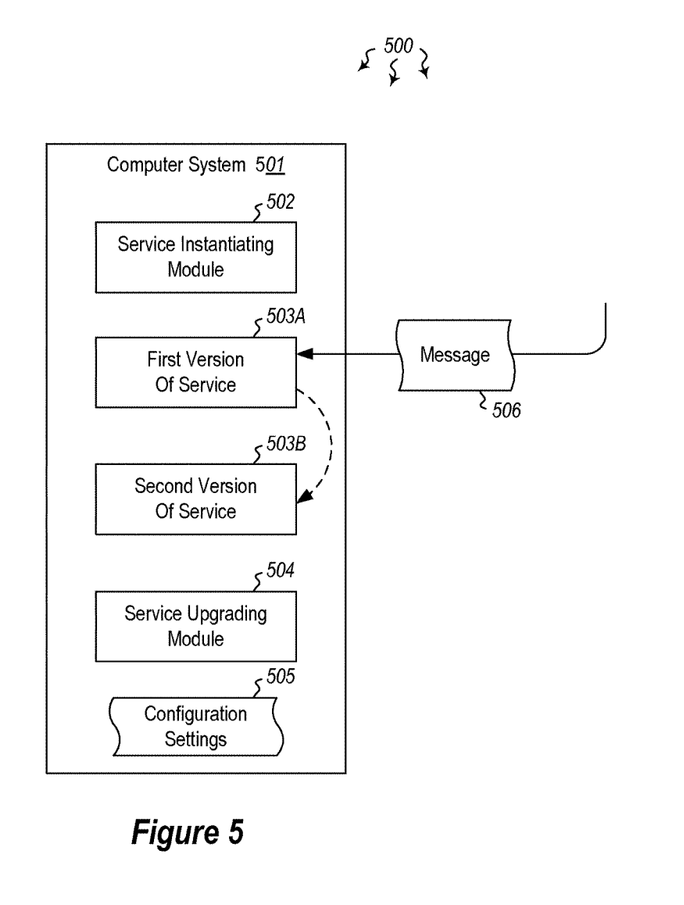
FIG. 5 illustrates an embodiment in which a received message is sent from a first version of a service to a second version of the service.

Method 300 next includes determining that a message sent to the first version of the service for processing is to be sent to the second version of the service (330). For instance, in the example above where the first version is a newer version, and the second version is an older version, a message 506 may be received which is only valid for older versions of the service, or at least includes one element that is not recognized or is not capable of being processed by the newer software version. The opposite case may also be true, where the first version 503A is an older version and the second version 503B is a newer version, and where the message 506 can only be processed by the newer version (503B). There may be many different reasons why one version may be able to process an incoming message and the other service version cannot. Irrespective of that reason, the computer system 101 may determine that message 506 is to be passed from the first version of the service 503A to a second version of the service 503B. The second version of the service may then be used to process the message 506 (340).

In one embodiment, the message 506 may be transferred to a second version of the service when the first version has failed. Thus, the second version of the service 503B provides a failover for the first service version. The second version may be older or newer than the first version in such failover scenarios. In some cases, one of the service versions (e.g. version one (503A) may be implemented automatically upon installation. Thus, as soon as installation is finished, the newly installed service version may automatically be used to process the incoming message 506. As such, services may be upgraded and automatically implemented after upgrade (e.g. by service upgrading module 504), substantially reducing or eliminating upgrade downtime. In some cases, once it is determined that the newly upgraded is running, the other (e.g. second) service version is automatically uninstalled.

Still further, determinations as to whether an incoming message is to be sent from the first version of the service 503A to the second version 503B for processing may be based on various logic evaluations. For example, if it takes, say, two or more seconds for the first version to respond to the message, the computer system 101 may determine that the first version is unavailable, and may then reroute the message to the second version of the same service. Other logic may be similarly configured and implemented. The above is only one example of a logic determination. Additionally or alternatively, the determination as to whether the message 506 is to be sent from the first version of the service 503A to the second version 503B for processing may be based on configuration settings 505 set by the user or by a system administrator.

In some cases, the message may be transferred from the first version to the second version and may be processed by both the first and second version simultaneously. In such cases, the outputs of the first and second versions of the service running simultaneously may be compared for errors produced during the processing. As such, a service provider may be able to test both versions of the application, and determine which version processes the message 506 with the fewest errors. A second (newer, perhaps beta) version may be installed and run along with the current version, so that the program developers log the results of the newer version and test the newer version without any increased risk. Additionally or alternatively, the service provider (or other user) may be able to determine which versions produce which errors. Using this data, the service provider may be able to specify which service version is best for each type of incoming message. This indication may be used in determinations by the computer system 501 to transfer incoming messages to the second version 503B or keep them at the first version 503A. In this manner, computer system 101 may continually determine which service version is to be used (or is the best to use) for each received message.

FIG. 4 illustrates a flowchart of a method 400 for implementing an external system integration service. The method 400 will now be described with frequent reference to the components and data of environments 100 of FIG. 1 and 600 of FIG. 6.

Method 400 includes determining that an internal message broker service 603 has been established, the message broker service being configured to maintain one or more message queues 604 that allow communication between services (e.g. publishers 606 and/or subscribers 607), the message queues being configured to receive messages from publishers 606 and transfer messages 605A/605B to subscribers 607 (410). The messages may be routed based on subscriptions and/or based on topic keys (as shown in FIG. 7). The service instantiating module 602 of computer system 601 may be used to instantiate the internal message broker service 603. The internal message broker service may be substantially the same as message broker service 102 as described in FIG. 1. The message queue may also be similar to or the same as the message queue 103 described in FIG. 1. The messages may include information about machines that are producing goods, including operational status messages, project status messages, error messages or other types of messages.

Figure 6:
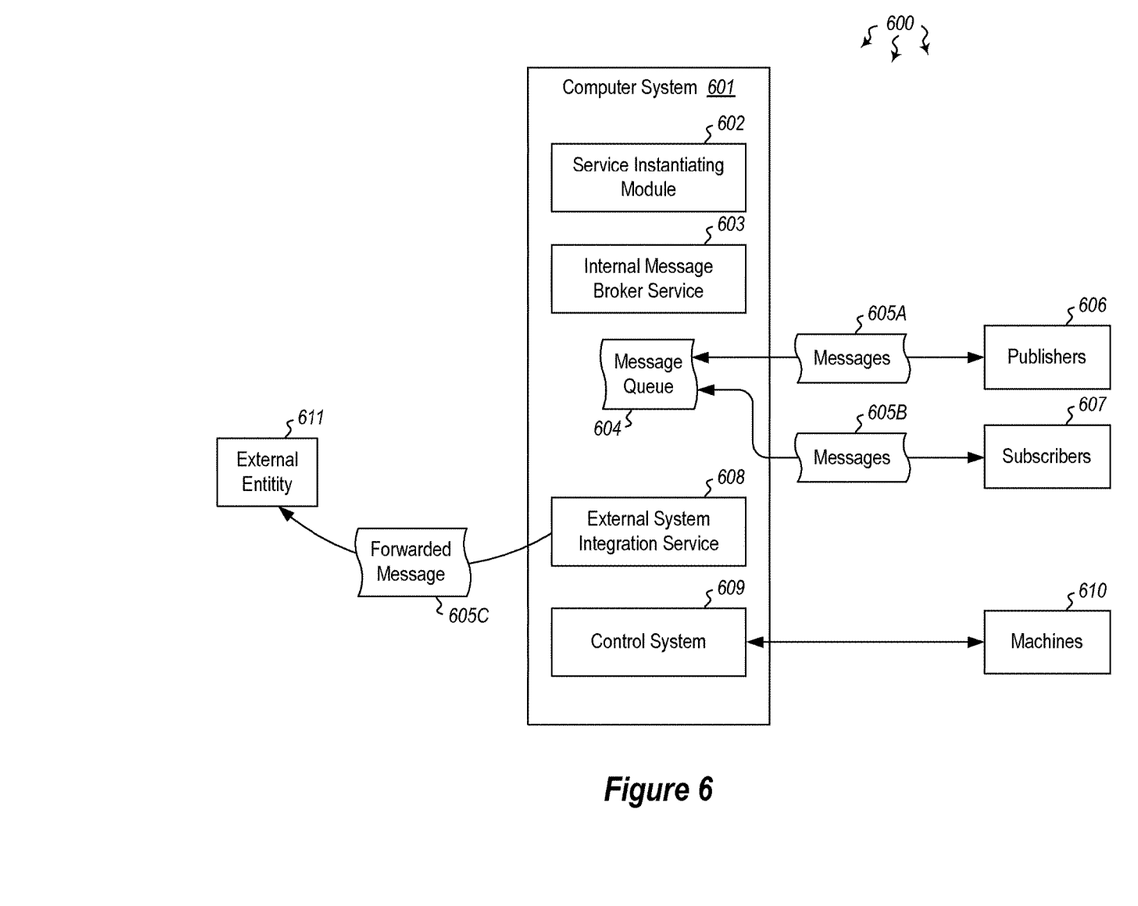
FIG. 6 illustrates an embodiment in which an external system integration service is implemented to forward messages to an external entity.

Method 400 further includes instantiating an external system integration service 608 in conjunction with the internal message broker service 603, the external system integration service 608 being configured to subscribe to specified, registered messages 605A/605B and forward the registered messages 605C to one or more external entities 611 (420). The external entities 611 may be external users, companies, computer systems, data stores or other entities that are external to computer system 601 or are external to where the internal message broker service 603 is being operated. The external system integration service 608 may be instantiated by the service instantiating module 602, and may be configured to listen to messages transferred between publishers 606 and subscribers 607 (e.g. any of services A, B or C (105A-105C) of FIG. 1).

The external system integration service 608 may then determine which of the messages is to be sent to a specified external entity. For instance, an external entity may specify that they want to receive any error messages or any operational status messages that indicate an error may have occurred. These messages would be "registered" messages, or messages which the external entity has subscribed or registered to receive. The messages to which the external system integration service is subscribed may be configured by or chosen from within the external system integration service, from within the external system that is using the external system integration service, or from within computer system 101. When such registered messages are received at the external system integration service (430), the external system integration service 608 may forward the received registered message 605C to the various specified external entities 611 (440).

The external system integration service can also be used to also handle conversion of messages to a specified external systems communication protocol or format. For example, if the external system communicates using a certain file type or protocol, the external system integration service 608 may translate the internal messages to a certain format (e.g. a comma separated format), and transmit the file using a specified protocol. Each external entity 611 may request different types of messages, or messages from certain publishers, or both. The external system integration service 608 may interact with any of the services using the messaging queue 604. The external system integration service may further publish methods that are made available to the external entities 611.

In some embodiments, a control system 609 may be instantiated as a service by the service instantiating module 602. The control system may be instantiated as a service in conjunction with the established internal message broker service 603 and/or the external system integration service. The control system may be configured to operate machine functionality for one or more specified machines 610. For instance, the control system may be configured to control when a machine turns on or off, when the machine is to process certain jobs, how the machine is to process the job (including configuration settings for each job), or control other machine operations. The machines 610 may be local or remote to the computer system 601, and may be additionally controlled by manual controls.

The service instantiating module 602 may also, at least in some embodiments, instantiate a message pipelining service. The message pipelining service may be configured to receive messages in a message pipeline that are to be handled in specified order. The message pipelining service may publish the received messages and subscribe to the results of that message. For instance, if the message was a machine command (e.g. for machine 610), the message pipelining service would be subscribed to and would receive the results of what happened as a result of that command. These message results may then be added as input arguments for each subsequently received message in the pipeline. The message pipelining service determines that the last message in the message pipeline has been received, and then publishes the results of the message pipeline to the subscribers 607. In this manner, a calling service can delegate any intermediate steps to the pipeline service.

Accordingly, methods, systems and computer program products are provided which allow services to be scaled and/or moved over a plurality of computer systems. Moreover, methods, systems and computer program products are provided which transition from one service version to another version, and implement an external system integration service that allows external entities to receive messages published by subscribers.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory;
one or more computer-readable storage media having stored thereon computer-executable instructions that, when executed by the one or more processors, causes the computing system to perform a method for scaling services, the method comprising the following:
establishing, at a first computer, a message broker service that maintains one or more message queues that allow communication between one or more services, the message queues being configured to receive messages from publishers and transfer messages to subscribers, wherein:
each of the one or more services is a subscriber or a publisher, and
at least one of the one or more services is distributed over multiple different computer systems;
indicating a specified message queue for each of the one or more services, the specified message queue being configured to maintain messages for that service including receiving messages that are published by the respective service and sending the received messages to services that are subscribed to receive messages of the respective service; and
moving the at least one of the one or more services from the first computer to a second, different computer system, wherein the specified message queue on the first computer system maintains messages for the at least one of the one or more services.

2. The computer system of claim 1, further comprising:
assigning each message a topic key that indicates the topic for that message; and
routing messages to subscribers based on the message's assigned topic key, such that messages associated with specified topic keys are routed by the message broker to subscribers that have subscribed to messages of that topic.

3. The computer system of claim 1, wherein publishers are unaware of who is subscribing to their messages.

4. The computer system of claim 1, wherein the message broker allows any of the services to publish to the message queue, and further allows any subscriber to receive messages from the message queue.

5. The computer system of claim 4, wherein one or more of the messages includes a security token that verifies the origin of the message.

6. The computer system of claim 5, further comprising:
   determining that the security token for at least one of the received messages is invalid; and
   ignoring the message that includes the invalid security token.

7. The computer system of claim 1, wherein a service selected from the one or more services is both a publisher and a subscriber.

8. The computer system of claim 1, wherein the at least one of the one or more services has at least two different instances of itself on the multiple different computer systems.

9. The computer system of claim 8, further comprising performing load balancing using the at least two different instances of the at least one service.

10. The computer system of claim 1, wherein one or more new services are dynamically added during runtime.

11. The computer system of claim 1, wherein one or more of the services are dynamically removed during runtime.

12. The computer system of claim 1, wherein one or more of the services is dynamically moved from one computing system to another computing system during runtime.

13. The computer system of claim 1, further comprising integrating a control system into the message broker service.

14. The computer system of claim 13, further comprising instantiating an external system integration service, the external system integration service being configured to subscribe to specified, registered messages and forward the registered messages to one or more external systems.

15. The computer system of claim 1, further comprising instantiating a message pipelining service that is configured to perform the following:
   receive one or more messages in a message pipeline that are to be handled in specified order;
   publish the received messages and subscribes to the results of that message;
   add the message results as input arguments for each subsequently received message in the pipeline;
   determine that the last message in a message pipeline has been received; and
   publish the results of the message pipeline to one or more subscribers.

16. The computer system of claim 1, further comprising: instantiating a service monitoring service, the service monitoring service being configured to perform the following:
   monitor the operational state of the services including the message broker service, wherein monitoring includes sending at least one status check to one or more of the services;
   determine whether the services have responded to the status checks; and
   for each service that has not responded to the status checks, notify one or more users or other systems that the service is not operating correctly.

17. The computer system of claim 16, further comprising:
   determining which services are performing at least one of the following: listening to specified message types, publishing specified message types, subscribing to specified message types, processing a specified number of messages and determining the number of messages processed by the computer system as a whole; and
   based on determination, performing at least one of the following:
      increasing the number of services to increase throughput; and
      decreasing the number of services to decrease processing costs.

18. The computer system of claim 17, further comprising:
   identifying which services, including one or more dependent services, are currently available for message processing; and
   controlling one or more message processing settings based upon the determined current availability of the services.

19. At a computer system including at least one processor and memory, a computer-implemented method for implementing an external system integration service, the method comprising:
   determining that an internal message broker service has been established, the message broker service being configured to maintain one or more message queues that allow communication between one or more services, the message queues being configured to receive messages from publishers and transfer messages to subscribers, at least one of the one or more services being distributed over multiple different computer systems;
   indicating a specified message queue for each of the one or more services, the specified message queue being configured to maintain messages for that service including receiving messages that are published by the respective service and sending the received messages to services that are subscribed to receive messages of the respective service; and
   moving at least one of the services from a first computer to a second, different computer system, wherein the specified message queue on the first computer system maintains messages for the moved service;
   instantiating an external system integration service in conjunction with the internal message broker service, the external system integration service being configured to subscribe to specified, registered messages and forward the registered messages to one or more external entities;
   receiving a message for which the external system integration service has registered; and
   the external system integration service forwarding the received registered message to the one or more specified external entities.

20. The method of claim 19, further comprising instantiating at least one control system as a service in conjunction with the established internal message broker service, the control system being configured to operate machine functionality for one or more specified machines.

21. The method of claim 19, wherein the external system integration service interacts with one or more services in the messaging queue.

22. The method of claim 19, wherein the external system integration service publishes a set of methods that are made available to the external entities.

23. At a computer system including at least one processor and memory, a computer-implemented method for scaling services, the method comprising:
   establishing, at a first computer, a message broker service that maintains one or more message queues that allow communication between one or more services, the message queues being configured to receive messages from publishers and transfer messages to subscribers, wherein:
      each of the one or more services is a subscriber or a publisher, and
      at least one of the one or more services is distributed over multiple different computer systems;

indicating a specified message queue for each of the one or more communicating services, the specified message queue being configured to maintain messages for that service including receiving messages that are published by the respective service and sending the received messages to services that are subscribed to receive messages of the respective service; and moving the at least one of the one or more services from a first computer to a second, different computer system, wherein the specified message queue on the first computer system maintains messages for the at least one of the one or more services.

24. The method of claim 23, further comprising:

assigning each message a topic key that indicates the topic for that message; and routing messages to subscribers based on the message's assigned topic key, such that messages associated with specified topic keys are routed by the message broker to subscribers that have subscribed to messages of that topic.

* * * * *